United States Patent
Eisenhardt

Patent Number: 5,998,959
Date of Patent: Dec. 7, 1999

[54] REGULATOR DEVICE FOR AN ASYNCHRONOUS MACHINE USED IN PARTICULAR AS A DRIVE FOR ELECTRIC VEHICLES

[75] Inventor: Martin Eisenhardt, Renningen, Germany

[73] Assignee: Robert Bosch GmbH, Stuttgart, Germany

[21] Appl. No.: 09/142,123

[22] PCT Filed: Jan. 22, 1997

[86] PCT No.: PCT/DE97/00123

§ 371 Date: Jan. 4, 1999

§ 102(e) Date: Jan. 4, 1999

[87] PCT Pub. No.: WO97/31798

PCT Pub. Date: Sep. 4, 1997

[30] Foreign Application Priority Data

Mar. 2, 1996 [DE] Germany ............................ 196 08 039

[51] Int. Cl.⁶ ..................................................... H02P 5/40
[52] U.S. Cl. ........................ 318/802; 318/805; 318/807; 318/430; 318/139
[58] Field of Search ........................... 318/139, 430–439, 318/799–830; 363/41, 49; 123/478, 480, 491, 492; 701/105

[56] References Cited

U.S. PATENT DOCUMENTS

| | | | |
|---|---|---|---|
| 3,824,437 | 7/1974 | Blaschke | 318/227 |
| 4,243,927 | 1/1981 | D'Atre | 318/803 |
| 4,338,559 | 7/1982 | Blaschke et al. | 318/805 |

(List continued on next page.)

FOREIGN PATENT DOCUMENTS

| | | |
|---|---|---|
| 0 555 574 | 8/1993 | European Pat. Off. |
| 0 579 513 | 1/1994 | European Pat. Off. |
| 34 10 293 | 9/1985 | Germany . |

OTHER PUBLICATIONS

F. Blaschke, "The field orientation method for controlling asynchronous machines" (Das Verfahren der Feldorientierung zur Regelung der Asynchronmaschinen), Siemens Research and Development Reports 1972, F. Blaschke, pp. 184–193.

W. Leonhard, "Control of Electrical Drives", 2nd Edition, Springer–Verlag, pp. 214–222, 1996.

*Primary Examiner*—Paul Ip
*Attorney, Agent, or Firm*—Kenyon & Kenyon

[57] ABSTRACT

A control apparatus for an asynchronous machine, in particular as a drive for electric vehicles, is equipped with an incremental transducer for the rotation speed of the asynchronous machine and a torque setpoint transducer, the signals of which can be delivered to a setpoint-value entry device in order to generate setpoint values (three-phase reference sine-wave system) for a closed-loop-controlled inverter or inverter power section to operate the asynchronous machine. The setpoint-value entry device contains means for defining at least the rotor frequency (slip frequency) and the amplitude as a function of the desired torque setpoint value. The setpoint-value entry device contains a summing device for adding or subtracting the rotor frequency to or from the mechanical rotation frequency, corresponding to the rotation speed, of the asynchronous machine as a function of the instantaneous rotation direction, the desired rotation direction, and the direction of the desired torque. On the basis of the output signal of the summing device, current setpoint profiles for the inverter or inverter power section, the amplitudes of which can be set as a function of the predefined amplitude, can be selected from a setpoint memory. This control apparatus allows many advantages of the field-oriented control method, and in particular improved efficiency in part-load operation, to be achieved with little outlay and in economical manner. In the particular case of electric vehicles, smooth starting from rest, or from a rolling motion at any speed opposite to the desired direction of motion, is guaranteed.

17 Claims, 1 Drawing Sheet

U.S. PATENT DOCUMENTS

| | | | |
|---|---|---|---|
| 4,429,267 | 1/1984 | Veale | 318/594 |
| 4,509,003 | 4/1985 | Ohnishi et al. | 318/800 |
| 4,510,430 | 4/1985 | Ashikaga et al. | 318/800 |
| 4,767,976 | 8/1988 | Mutoh et al. | 318/808 |
| 4,808,903 | 2/1989 | Matsui et al. | 318/800 |
| 5,047,704 | 9/1991 | Yamauchi | 318/801 |
| 5,235,503 | 8/1993 | Stemmler et al. | 363/37 |
| 5,481,168 | 1/1996 | Mutoh et al. | |
| 5,650,700 | 7/1997 | Mutoh et al. | 318/432 |

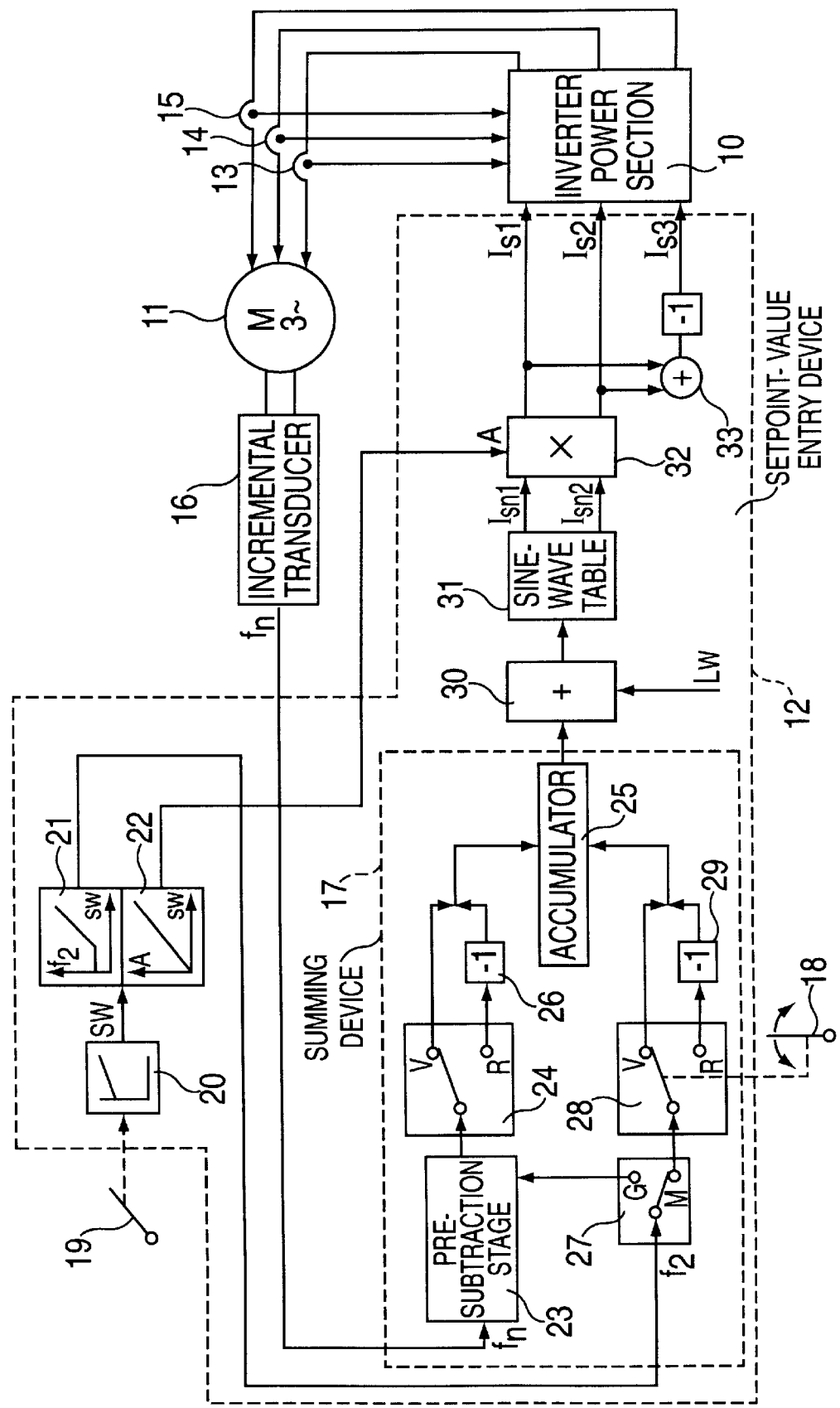

5,998,959

REGULATOR DEVICE FOR AN ASYNCHRONOUS MACHINE USED IN PARTICULAR AS A DRIVE FOR ELECTRIC VEHICLES

FIELD OF THE INVENTION

This application is a 371 of PCT/DE97/00123 filed Jan. 22, 1997.

The present invention relates to a control apparatus for an asynchronous machine, in particular as a drive for electric vehicles.

BACKGROUND INFORMATION

A conventional control apparatus is described in U.S. Pat. No. 5,481,168. In this conventional apparatus, the rotation speed of a three-phase induction motor is delivered via an analog/digital converter to a rotation speed measurement device in order to regulate an asynchronous machine. A setpoint transducer predefines a torque, and these signals are fed into a three-phase system to generate setpoint values. The sensed rotation speed of the asynchronous machine is compared to the predefined rotation speed, and the difference is delivered to the power section of an inverter as the setpoint value.

Another conventional control apparatus of this kind is the so-called "field-oriented" control system as described, for example, in Siemens Research and Development Reports 1972, F. Blaschke, "The field orientation method for controlling asynchronous machines", p. 184 ff., or in the textbook "Control of Electrical Drives," W. Leonhard, Springer-Verlag, pp. 214–222. With the field-oriented control system, both the amplitude of the stator flux vector and its position with respect to the rotor flux vector must be monitored at all times. One of the principal tasks in this connection is decoupling the torque-based and flux-based currents from the magnitude of the stator current vector. It is also important to ensure that they are at right angles to one another, in a rotor-based coordinate system, at all times. This requires sensing the stator currents of the three-phase system, transforming them into a coordinate system which rotates synchronously with the rotor flux, and comparing them with the setpoint definitions for the flux-forming component and torque-forming component of the current. The new current/voltage values applied to the motor are based on calculation and inverse transformation from the rotating reference system to the steady-state stator coordinate system. The field-oriented control system yields a constant torque even above the nominal rotation speed, improved velocity consistency even under fluctuating load conditions, and high efficiency at full load, but the technical outlay is high and costly.

SUMMARY OF THE INVENTION

The control apparatus according to the present invention achieves many of the advantages of the field-oriented control system with technically simpler means and in more economical fashion, and achieves better efficiency particularly in part-load operation, which is principally relevant for electric vehicles. The demands on the incremental transducer are low. Four-quadrant operation is possible. In addition, smooth starting from rest, or from a rolling motion at any speed opposite to the desired direction of motion, is achieved in outstanding fashion.

The setpoint-value entry device advantageously contains function tables for the rotor frequency and the amplitude of the stator current as a function of the desired torque setpoint. In addition, function tables can also be provided for the load angle pilot control. The machine parameters are reflected in the values obtained from the function tables. Each setpoint input is associated with a different value pair or value triplet.

In order to take into account the particular rotation direction of the asynchronous machine, the summing device possesses a first switching device which switches over automatically as a function of the particular rotation direction and with which the signals from the incremental transducer, that are proportional to the mechanical rotation frequency, are given a negative value in the reverse switch position and a positive value in the forward switch position.

In order also to take into account the desired rotation direction and the direction of the desired torque when defining the setpoint, the summing device additionally possesses a second switching device which switches over as a function of the desired direction of the torque (generator or motor mode): in generator mode, the signals corresponding to the rotor frequency are subtracted from the incremental transducer signals prior to analysis by the first switching device, and in motor mode the signals corresponding to the rotor frequency are added to the incremental transducer signals analyzed by the first switching device when the forward rotation direction is predefined, and subtracted from them when the reverse rotation direction is predefined. In this manner, the instantaneous rotation direction, the desired rotation direction, and the direction of the desired torque are automatically taken into account in defining the setpoint.

A third switching device controllable by a travel direction switch is preferably provided for corresponding analysis of the signals corresponding to the rotor frequency for the forward and reverse rotation directions.

To constitute a reference signal from the signals of the incremental transducer and the signals corresponding to the rotor frequency, an accumulator is preferably provided whose inputs are advantageously connected to the outputs of the second and third switching devices.

The setpoints are selected via values determined in the summing device which each constitute an address for a sine-wave table serving as the setpoint memory. A further improvement can be achieved in that a load angle correction stage for correcting the address values as a function of a load angle respectively matching the desired torque, configured in particular as an adding stage, is provided.

The amplitude of the stator current that is desired or is predefined by the setpoint input is advantageously established by the fact that a multiplier stage, for multiplying the current setpoint profiles by the respectively predefined amplitude value, is connected downstream from the setpoint memory.

The closed-loop-controlled inverter advantageously contains a two-point controller to which three current setpoint profiles, constituted from the setpoint profiles at the output of the setpoint memory by way of a conversion stage, are delivered.

BRIEF DESCRIPTION OF THE DRAWING

The FIG. shows a block diagram of a control apparatus for an asynchronous machine according to an exemplary embodiment of the present invention.

DETAILED DESCRIPTION

In the exemplary embodiment depicted in the single FIGURE, a closed-loop-controlled inverter power section 10 controls an asynchronous machine 11 which serves to drive an electric vehicle (not illustrated). Other possible applications of the asynchronous machine may, of course, also be implemented. Inverter power section 10 contains a two-point hysteresis controller (not depicted in detail) for injecting the three setpoint currents $I_{s1}$, $I_{s2}$, and $I_{s3}$ into asynchronous machine 11, these setpoint currents being generated in a setpoint-value entry device 12. The three actual currents necessary for the control system are sensed in current measurement devices 13–15 in the three supply leads to asynchronous machine 11, and delivered back to inverter power section 10. The basis of the modulation principle is that the two-point hysteresis controller in inverter power section 10 compares a three-phase reference sine-wave system (setpoint profiles) to the actual currents of asynchronous machine 11, thus supplying the appropriate activation signals for the power switch (not depicted) in inverter power section 10. This is therefore a current-impressing method. The principal task of this modulation method is to generate, by way of setpointvalue entry device 12, a reference sine-wave system which is optimum for each operating condition of the machine. That makes it possible to define any desired combination of rotor frequency $f_2$ (slip frequency) and reference sine-wave system amplitude. The rotor frequency is the frequency actually "seen" by the rotor of asynchronous machine 11, regardless of the instantaneous rotation speed of the rotor. For this, the reference sine-wave system is used to impress onto the stator of the machine a frequency which is greater, by the desired rotor frequency $f_2$ than the frequency which would correspond to the mechanical rotation speed. Also delivered to inverter power section 10, in a conventional manner, is an intermediate circuit voltage which, in electric vehicles, is the battery voltage.

The torque request, from the driver of the electric vehicle or some other operator, for the asynchronous machine contains three data elements, namely the desired travel direction, the magnitude of the torque, and the direction of the torque (i.e. motor mode or generator mode). These three data elements are needed to generate the setpoint system. Information about the rotation speed and direction of asynchronous machine 11 is also necessary. The rotation speed $f_n$ of asynchronous machine 11 is ascertained using an incremental transducer 16 whose signals are delivered to a summing device 17 in setpoint-value entry device 12. The desired travel direction (forward/reverse) is defined by way of a travel direction switch 18. The magnitude of the torque is defined by the driver via an accelerator pedal 19, motor mode of asynchronous machine 11 being present or selected when accelerator pedal 19 is actuated, and generator mode thereof when the accelerator pedal is not actuated. A brake pedal (not depicted) is also provided in the electric vehicle. The pedal positions lead to either a drive setpoint or a braking setpoint. When both pedals are in the rest position, braking status is established. A vehicle management system which generates the setpoints can also be provided in a conventional manner.

The magnitude A of the amplitude of the reference sine-wave system to be generated, the rotor frequency $f_2$, and a load angle signal Lw, are generated from the magnitude of the preselected torque. For this, accelerator pedal 19 is coupled to a signal generator stage 20 which generates at its output a setpoint signal sw, corresponding to the accelerator pedal position, for the torque. From this signal sw, the optimum combination of values $f_2$ and A pertaining to each setpoint input is selected from a rotor frequency table 21 and an amplitude frequency table 22. In addition, the load angle signal Lw can be selected from a third table (not depicted).

The reference sine-wave system to be generated is then approximated using i interpolation points. The rotation speed is ascertained by incremental transducer 16 using n signals per revolution, and the asynchronous machine has p pole pairs. The idea is to correct the rotation speed and phase of the electrical system to the mechanical rotary motion of the rotor, thus obtaining a reference sine wave which initially is synchronous with the mechanical rotary motion. This is achieved by the fact that each signal of the incremental transducer results directly in an advance of the phase of the reference sine wave in accordance with its weight. That weight depends on the number of signals of the incremental transducer per revolution, and on the number of motor pole pairs.

In order to obtain a torque, the frequency of this reference sine wave must be increased or decreased by exactly the rotor frequency $f_2$ matching the particular torque input, as a function of the instantaneous rotation direction, the desired rotation direction, and the direction of the desired torque. If these parameters can be varied at will, a fully capable four-quadrant drive is then implemented. This implementation is attained by way of summing device 17.

In summing device 17, the incremental transducer signals $f_n$ are conveyed via a pre-subtraction stage 23 to a first switchover device 24, these signals being delivered to an accumulator in the forward switch position, and via a sign-changing stage 26 to accumulator 25 in the reverse switch position. The forward/reverse switching signal for first switching device 24 is obtained, in a conventional manner from the signals of incremental transducer 16.

The rotor frequency $f_2$ is also delivered to a second switchover device 27 where in generator mode G it is delivered to a subtraction input of pre-subtraction stage 23, and in motor mode M it is delivered to a third switchover device 28. The two switch positions (generator mode G and motor mode M) are predefined as reference variables via accelerator pedal 19. The two switch positions (forward V and reverse R) of third switchover device 28 are also predefined as reference variables via travel direction switch 18. In the forward switch setting, the rotor frequency signals $f_2$ are delivered directly to accumulator 25, and in the reverse switch position they are delivered to that accumulator 25 via a sign-changing stage 29.

In generator mode, G the weight of the incremental transducer pulses $f_n$ is reduced in pre-subtraction stage 23 in accordance with rotor frequency $f_2$. The signals thereby obtained are delivered by first switchover device 24, as positive or negative pulses depending on whether the vehicle is traveling forward or in reverse, to accumulator 25, where an addition or subtraction takes place accordingly. In motor mode, M the rotor frequency signals $f_2$ are delivered to the accumulator as positive or negative signals as a function of whether forward or reverse travel was preselected via third switchover device 28, so that the content of accumulator 25 is incremented by the weight of the rotor frequency in the case of forward travel, and decremented thereby if reverse travel is desired.

A load angle adding stage 30 in which a load angle value Lw is also added to the accumulator value is connected downstream from accumulator 25. This load angle pilot control system once again manipulates the phase of the system; for vehicle drives, it is generally sufficient to keep the magnitude of the load angle constant, simply ensuring that the direction always points in the direction of the desired torque. For highly dynamic drives, a different load angle magnitude will be associated with each torque input. For this reason, a load angle adding stage 30 of this embodiment can be omitted from vehicle drives.

The accumulator value corrected by load angle adding stage 30 represents the address for a downstream sine-wave table 31, in which two standardized sine-wave signals $I_{sn1}$ and $I_{sn2}$, offset by 120 degrees, are constituted. In downstream multiplication stage 32, these standardized sine-wave signals are multiplied by the matching amplitude A of reference sine-wave system $I_{s1}$ and $I_{s2}$ to be generated. The third setpoint $I_{s3}$ is easily obtained by way of an adding stage 33 and a sign-changing stage 34.

What is claimed is:

1. A control apparatus for controlling an asynchronous machine, comprising:

an incremental transducer determining a rotation speed of the asynchronous machine, the incremental transducer generating incremental transducer signals corresponding to a mechanical rotational frequency, the mechanical rotational frequency corresponding to the rotation speed and being determined as a function of an instantaneous rotation direction, a predetermined rotation direction and a predetermined torque direction;

a torque setpoint transducer generating torque output signals;

an inverter system having a three-phase reference sine-wave system, the inverter system being one of a closed-loop-controlled inverter and an inverter power section; and a setpoint-value entry device receiving the torque output signals to generate setpoint values in the three-phase reference sine-wave system for operating the asynchronous machine, the setpoint-value entry device including:

an arrangement defining at least a rotor frequency or a slip frequency, and a predetermined amplitude, as a function of a predetermined torque setpoint value, a summing device receiving the incremental transducer signals and generating a summing output signal, and a setpoint memory, wherein the setpoint-value entry device selects current setpoint profiles from the setpoint memory for the inverter system as a function of the summing output signal, the current setpoint profiles having amplitudes which are selected as a function of the predetermined amplitude.

2. The control apparatus according to claim 1, wherein the arrangement has function tables to define the rotor frequency and the predetermined amplitude of a stator current as a function of the predetermined torque setpoint value.

3. The control apparatus according to claim 2, wherein the arrangement includes further tables to define a load angle pilot control as a function of the predetermined torque setpoint value.

4. The control apparatus according to claim 1, wherein the summing device includes a first switching device which automatically switches as a function of the instantaneous rotation direction of the asynchronous machine, and wherein the first switching device generates a negative value in a reverse switch position and a positive value in a forward switch position using the incremental transducer signals received from the incremental transducer, the incremental transducer signals being proportional to the mechanical rotational frequency.

5. The control apparatus according to claim 4, wherein the summing device further includes a second switching device which switches as a function of the predetermined torque direction in one of a generator mode and a motor mode, wherein, in the generator mode, rotor signals corresponding to the rotor frequency are subtracted from the incremental transducer signals before the rotor signals are analyzed by the first switching device, and wherein, in the motor mode, the rotor signals are added to the incremental transducer signals, the rotor signals being analyzed by the first switching device when a forward rotation direction is predefined, the rotor signals being subtracted from the incremental transducer signals when a reverse rotation direction is predefined.

6. The control apparatus according to claim 5, further comprising:

a travel direction switch, wherein the summing device further includes a third switching device controllable by the travel direction switch, the third switching device analyzing the rotor signals for the forward and reverse rotation directions.

7. The control apparatus according to claim 6, wherein the setpoint-value entry device includes an accumulator which generates a reference signal as a function of the incremental transducer signals and the rotor signals.

8. The control apparatus according to claim 7, wherein outputs of the second and third switching devices are connected to inputs of the accumulator.

9. The control apparatus according to claim 6, wherein the setpoint-value entry device includes an accumulator which generates a reference signal as a function of the incremental transducer signals and the rotor signals.

10. The control apparatus according to claim 1, wherein the setpoint memory has a sine-wave table, and wherein the summing device determines at least one value indicative of at least one corresponding address in the sine-wave table.

11. The control apparatus according to claim 10, wherein the setpoint-value entry device includes a load angle correction stage which corrects the at least one value as a function of a load angle to match a predetermined torque.

12. The control apparatus according to claim 11, wherein the load angle correction stage is an adding stage.

13. The control apparatus according to claim 1, wherein the setpoint-value entry device includes a multiplier stage which multiplies the current setpoint profiles by a value of the predetermined amplitude, and wherein the multiplier stage is connected to the setpoint memory downstream from the setpoint memory.

14. The control apparatus according to claim 1, wherein the setpoint-value entry device includes a stage which generates three current setpoint profiles, and wherein the stage is associated with at least one of the setpoint memory and a multiplier stage.

15. The control apparatus according to claim 1, wherein the inverter system includes a two-point controller.

16. The control apparatus according to claim 15, wherein the two-point controller is a two-point hysteresis controller.

17. The control apparatus according to claim 1, wherein the control apparatus is a drive for an electric vehicle.

* * * * *

UNITED STATES PATENT AND TRADEMARK OFFICE
CERTIFICATE OF CORRECTION

PATENT NO. : 5,998,959
DATED : December 7, 1999
INVENTOR(S) : Martin Eidenhardt

It is certified that error appears in the above-identified patent and that said Letters Patent is hereby corrected as shown below:

Column 1,
Line 26, delete "of this kind";

Column 4,
Line 28, after "manner" insert--, --;

Column 4,
Line 43, after "mode" delete --,-- after "G" insert --,--;

Column 4,
Line 50, after "mode" delete --,-- after "M" insert --,--;

Signed and Sealed this

Twelfth Day of June, 2001

*Nicholas P. Godici*

Attest:

Attesting Officer

NICHOLAS P. GODICI
*Acting Director of the United States Patent and Trademark Office*